Oct. 17, 1939.  G. P. BENTLEY  2,176,197

EARTH INDUCTOR COMPASS

Filed May 18, 1937  2 Sheets-Sheet 1

INVENTOR
George P. Bentley
BY
Herbert H. Thompson
HIS ATTORNEY.

Oct. 17, 1939.　　　G. P. BENTLEY　　　2,176,197
EARTH INDUCTOR COMPASS
Filed May 18, 1937　　2 Sheets-Sheet 2

INVENTOR
George P. Bentley
BY Herbert H. Thompson
HIS ATTORNEY.

Patented Oct. 17, 1939

2,176,197

UNITED STATES PATENT OFFICE 2,176,197

EARTH INDUCTOR COMPASS

George P. Bentley, Wollaston, Mass., assignor to Sperry Gyroscope Company, Inc., Brooklyn, N. Y., a corporation of New York Application May 18, 1937, Serial No. 143,265

7 Claims. (Cl. 33—204)

This invention relates to navigational aids or flight instruments for aircraft and other moving vehicles, and especially to improvements in magnetic compass arrangements.

Most of the errors in the magnetic compass are due to turning of the craft at high speed, which causes wide deviation of the ordinary magnetic compass under certain conditions. It has been known that stabilizing such a compass would improve its operation, but many difficulties have prevented a complete solution of the problem with the ordinary magnetic needle.

I propose, therefore, a special combination between an earth inductor compass and a gyro vertical or gyroscopic artificial horizon, such that the earth inductor compass is stabilized to maintain its rotation in a truly vertical plane. While the so-called earth inductor compass is not new, in its usual form it is not a true compass, but merely indicates deviation from course by the deflection of a galvanometer needle to the right or left. In my device, on the other hand, by a few changes I have converted the ordinary rotor of an artificial horizon into a true compass, so that in one instrument I have combined a true compass and an artificial horizon so that the true attitude of the plane about all three principal axes is shown on one face and by one instrument.

Referring to the drawings, showing the preferred form of my invention,

Figure 1:
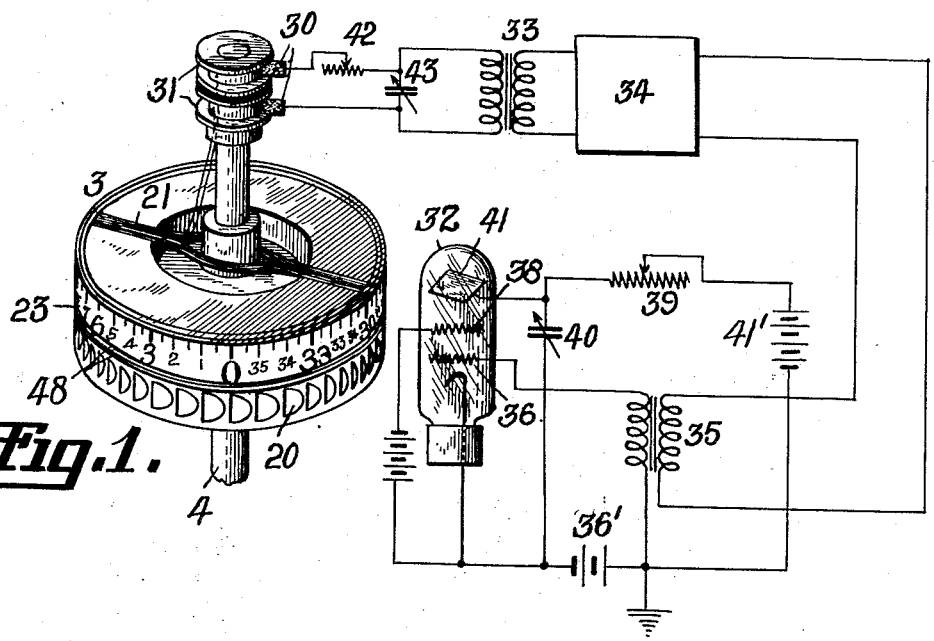
Fig. 1 is a diagram showing the electrical principles involved in my invention.
Figure 2:
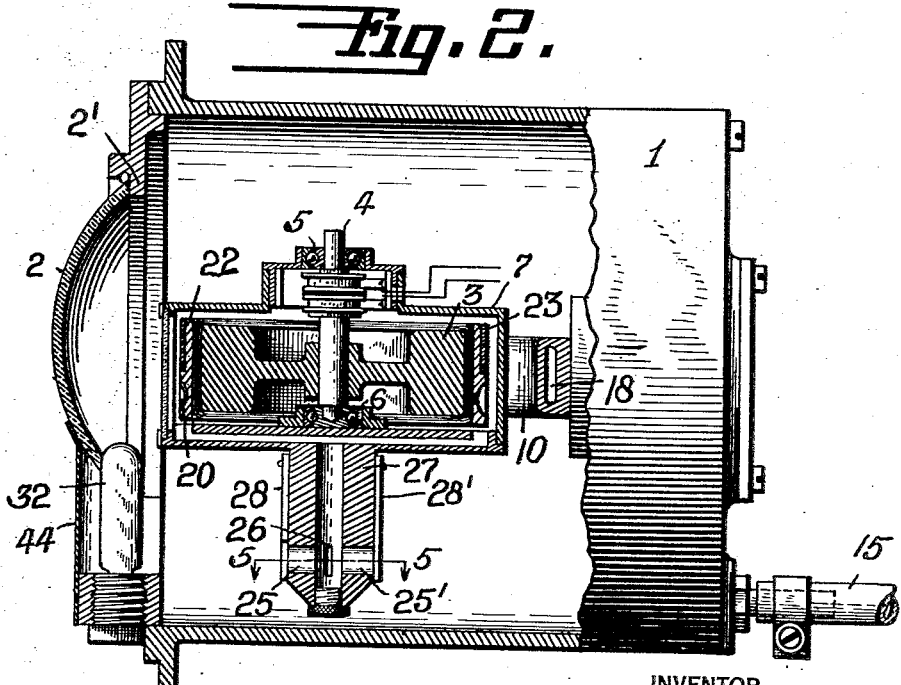
Fig. 2 is a vertical section through my combined artificial horizon and compass.

My device may be constructed along the lines of a standard gyroscopic artificial horizon, the instrument being shown as mounted within a closed casing 1 having at its forward end a window 2. The gyroscope proper is shown as comprising a rotor 3 mounted on a vertical shaft 4, journaled in upper and lower bearings 5, 6 within rotor bearing casing 7. Said casing, in turn, is mounted for oscillation about a horizontal axis on normally horizontal trunnions 8, 9 in gimbal ring 10, which is preferably semicircular, having no forward bearing but journaled at its rear for oscillation about a horizontal axis at right angles to horizontal axis 8, 9 by means of a long stud 11 journaled in spaced bearings 12 and 13 in the rear wall 14 of the instrument casing 1.

The rotor is preferably air spun, and for this purpose the air is normally continuously withdrawn through pipe coupling 15 from the interior of the casing 1, the air at atmospheric pressure entering through screen 16, passing through apertures in bearing 13 and axial opening 17 in the stud 11 to pass within channel 18 in gimbal ring 10, whence the air passes through the hollow studs 8 and 9 to spinning jets 19, the air from which impinges buckets or blades 20 on the rotor.

Figure 4:
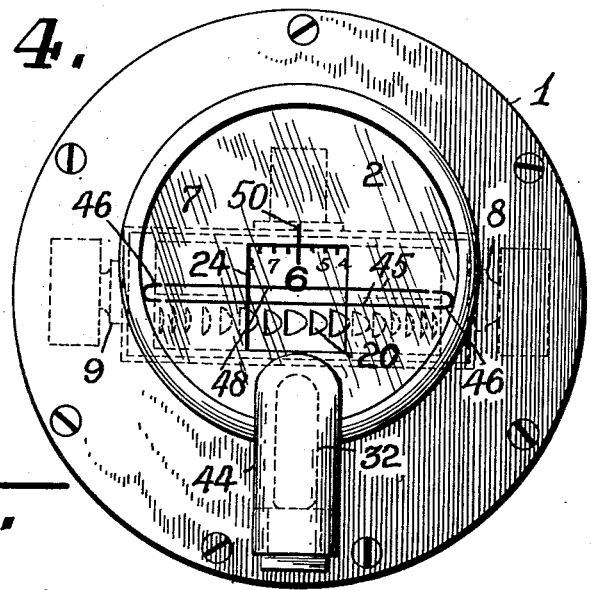
Fig. 4 is a face view of the device.

The rotor is preferably made of non-magnetic material, such as brass, and around the same is placed a coil of wire or armature 21, which may consist of comparatively few turns. Preferably, said coil is imbedded in the face of the rotor and over the same is shrunk a ring 22, also preferably non-magnetic, in the lower part of which the buckets 20 are shown as cut, and the upper part of which is graduated in degree graduations or other compass graduations to indicate direction. If desired, the graduations may be provided on a separate thin ring 23 around the upper portion of ring 22. A small portion of the card is shown as visible through a front window 24 in the rotor bearing case 7 (Fig. 4).

Figure 5:
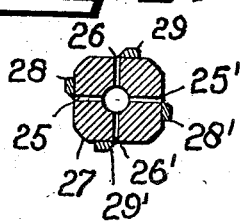
Fig. 5 is a transverse section taken approximately on line 5—5 of Fig. 2.

The artificial horizon is maintained horizontal by means of any suitable erection device, such as disclosed in the prior patent to Bert G. Carlson, #1,982,636, dated December 4, 1934. According to this system, the exhaust air escapes from the casing through a plurality of laterally directed slots 25, 25', 26, 26' in a downwardly projecting extension 27 on the gyro case, the amount of air issuing from each slot being varied by balanced pairs of oppositely acting pendulous shutters or other equivalent gravitationally responsive means 28, 28' and 29, 29' (see Fig. 5).

The electrical output from the coil 21 is picked off by suitable brushes 30 bearing on slip rings 31. This coil, since it is rotated in the earth's magnetic field, will produce an alternating voltage of a frequency equal to the R. P. M. of the rotor.

According to the well known principles of stroboscopics, if a means be provided to view the card 23 at each revolution at a certain point in said revolution, an indication on the card can be read by an observer, which indication will show the relative heading of the ship in the earth's magnetic field, so that the device may be used as a true compass. For this purpose, I propose to employ a quick flashing lamp 32, such as a neon or other gas filled lamp of special construction, which is designed to be tripped at a selected point in each revolution of the rotor or each predetermined number of revolutions, such as each second revolution. The light from this lamp will therefore render visible to the observer the compass reading as shown in Fig. 4, the lubber line 50 being on the front of casing 7, the reading being clear and definite even though the rotor may be revolving several thousand R. P. M. The lamp is shown as mounted in the bottom of the casing, a shield 44 being provided so that rays therefrom are directed onto the rotating disc and glare kept out of the observer's eyes.

Figure 3:
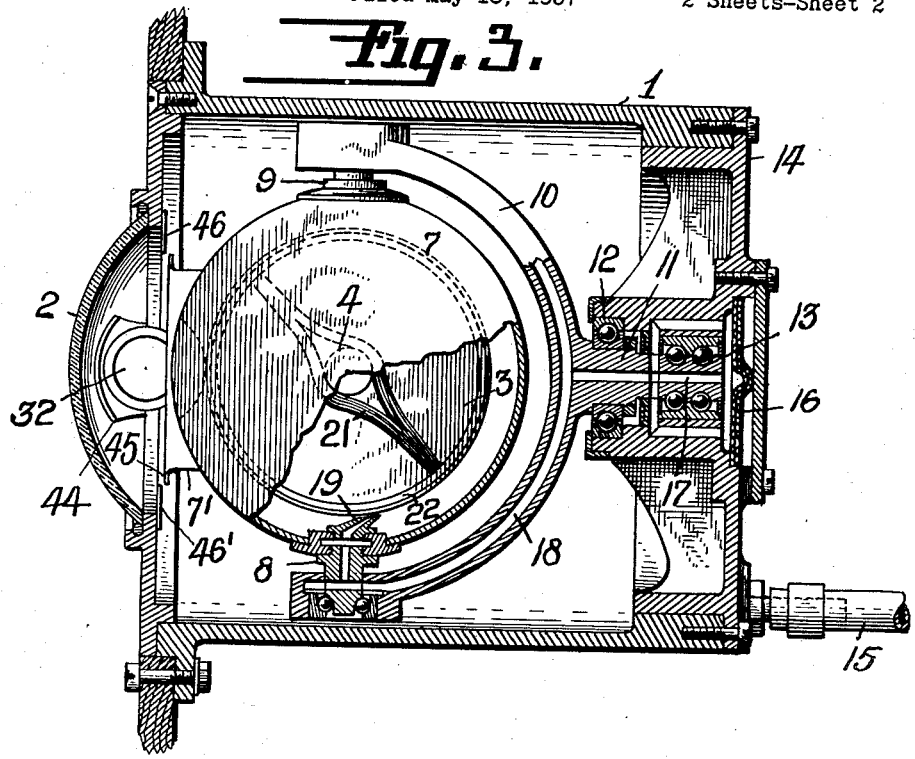
Fig. 3 is a horizontal section of the same, parts being in elevation.

Not only does my invention operate as a compass, but also as an artificial horizon, merely by providing reference lines 45 on the case 7 or on an extension 7' therefrom (Fig. 3) which are read in connection with fixed pointers 46, 46' on the inside of opening 2' or on window 2. Since lines 45 are on the gyro rotor casing, they will indicate both roll and pitch, and the reading on the compass card 23 shows compass heading, all on one face of a single unitary instrument. It is obvious that a horizontal marking 48 on card 23 will serve the same purpose and may be used with or without lines 45.

A simple circuit for this purpose is shown in Fig. 1, the arrangement preferably being such that the lamp is lighted whenever the voltage from the coil 21 passes through zero in one direction, say from negative to positive. Using the zero point gives a very sharp flash point, since the voltage at that time is changing at its maximum rate, whereas the voltage at the time of maximum voltage is changing at its minimum rate. The output from the brushes is shown as led through a transformer 33 and suitable amplifier 34, thence through a second transformer 35, the output of which is applied to one of the grids 36 of the gas filled thermionic tube 32 (such as a cold cathode or "Strobatach" tube). Said tube is shown as provided with a second grid 38 which normally maintains the tube biased so that it will not go on until the grid 36 passes through zero; in other words, until the grid 36 becomes slightly positive.

In the plate circuit of said tube I have shown means for delaying the supply of plate potential to the tube, said means consisting of a variable resistance 39 and condenser 40, the latter being charged through resistance 39 from the plate supply 41'. The resistance 39 is adjusted so that the time taken for an operating plate potential to build up on condenser 40 is greater than the period of a half cycle of the current from coil 21, but usually equal to or less than a full cycle. During the portion of the cycle preceding the flashing of the tube 32, the condenser 40 is being charged, causing an increasing potential on the plate 41 so that the tube fires preferably as soon as the potential from coil 21 supplied through transformer 35 to grid 36 passes through zero at the beginning of its positive half cycle, the bias on the outer grid 36 from source 36' being adjusted to accomplish this result. By firing the tube 32 each time the voltage of coil 21 passes through zero while rising, instead of at the top of the voltage curve, uncertainty of reading, as explained above, and also uncertainty of operation due to variations in voltage output of coil 21 is avoided. As soon as the tube fires, the condenser discharges through the tube and removes the operating potential from plate 41, so that the tube is immediately extinguished. The charge then starts to build up again, but the tube remains out until the potential output of coil 21 again passes through zero from negative to positive.

In case it is found that the time factors involved are too short for the tube to flash each revolution of the wheel, or for the purpose of decreasing the power consumption of the illuminating device, I propose to vary the time constant of the circuit 39, 40 so that a discharge will take place every integral number of revolutions, say every second, third, fourth or fifth revolution. This may easily be arranged by varying either or both the resistance 39 and condenser 40 so that the positive charge on plate 41 will not rise to sufficient value to overcome the bias on grid 36 until the last half of the second or desired cycle is reached after a flash. The persistence of human vision will permit flashing frequencies of any number greater than 20 per second to produce an apparently continuous illumination.

My invention also offers simple means for correcting for magnetic variations in different latitudes. This may be done by changing the electrical phase position of the output of coil 21 by an amount equal and opposite to the magnetic variation. A simple manner of effecting this is to interpose a series resistance 42 and a shunt condenser 43 between the brushes 30 and transformer 33, one or both of which are variable, and by which the phase of the input to the tube may be varied with respect to the phase of the output of coil 21 the proper amount to correct for the magnetic variation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A flight instrument for aircraft showing attitude in all three planes, including a gyroscopic rotor, a rotor bearing frame in which said rotor is journaled for spinning about a normally vertical axis, said casing being universally gimballed, roll and pitch indicating means stabilized by said gyroscope in both planes, a compass card on said rotor, an earth inductor winding rotatable with said rotor, and stroboscopic means operable from said winding for rendering said card visible only when said winding passes through a predetermined position in the earth's magnetic field.

2. A flight instrument as claimed in claim 1, wherein said stroboscopic means operates when the alternating E. M. F. supplied by said winding passes through zero as the E. M. F. rises.

3. In a flight instrument for aircraft, a gyro vertical, means mounting said gyro for spinning about a vertical axis and for movement about two mutually perpendicular horizontal axes, said two axes being substantially coplanar, an earth inductor rotatable with said gyro, a magnetic compass card of the annular or side reading type spinning with said gyro, a substantially vertical window through which said card is visible from the front, indices adjacent said card for showing the attitude of the craft in all planes, and stroboscopic means synchronized with said gyro and actuated by said earth inductor for viewing said card.

4. In a flight indicator for aircraft, an outer casing, a gyroscope, means for universally mounting said gyroscope within said casing including an outer gimbal pivotally mounted in said casing in a single bearing at the rear, said gyroscope being pivotally mounted in said gimbal athwartships, an earth inductor rotatable with the rotor of said gyroscope, a magnetic compass card mounted on said gyroscope to spin with its rotor, a front window in said casing through which said compass card is visible, and stroboscopic means synchronized with said rotor and actuated by said earth inductor for viewing said card.

5. An earth inductor compass comprising armature means, rotatable about a normally vertical axis, a compass card rotatable with said armature means, a timed thermionic tube condenser discharge circuit fed from the output of said armature means, said circuit including a stroboscopic lamp for sequentially illuminating said card to indicate headings, and means for varying the phase of the output of said armature means for correcting for magnetic variation.

6. An earth inductor compass showing true direction, comprising a coil, means for rotating the same in the earth's magnetic field, a compass card rotatable with said coil, and means for rendering said card visible whenever the E. M. F. induced in said coil passes through zero in one direction, including a multi-element thermionic tube, one element of which is controlled by said E. M. F., a discharge circuit in the output thereof adapted to fire the tube at a predetermined point in the cycle, means for adjusting the time factor of said circuit, whereby firing occurs but once in every predetermined number of revolutions of said coil, and means for varying the phase of the output of the coil to correct for magnetic variation.

7. A flight instrument as claimed in claim 1, wherein said compass card is of the cylindrical type and is mounted on the exterior of said rotor to be visible from the front of the instrument.

GEORGE P. BENTLEY.